(12) United States Patent
Sheeran et al.

(10) Patent No.: US 8,558,146 B2
(45) Date of Patent: Oct. 15, 2013

(54) POSITION CONTROL WITH COMPENSATION FOR THERMAL CYCLING OF A WORKPIECE SUPPORT

(75) Inventors: Steve Sheeran, Longmont, CO (US); Mark A. Toffle, Saint Louis Park, MN (US); Mark D. Anderson, Champlin, MN (US); Rodney D. Dahlenburg, Prior Lake, MN (US); Colin G. Presly, Shakopee, MN (US); Paul J. Poisson, Boulder, CO (US)

(73) Assignee: Seagate Technology LLC, Cupertino, CA (US)

( * ) Notice: Subject to any disclaimer, the term of this patent is extended or adjusted under 35 U.S.C. 154(b) by 1544 days.

(21) Appl. No.: 12/050,044

(22) Filed: Mar. 17, 2008

(65) Prior Publication Data

US 2009/0230110 A1 Sep. 17, 2009

(51) Int. Cl.
*H05B 3/68* (2006.01)
(52) U.S. Cl.
USPC .................... 219/444.1; 219/159; 324/212

(58) Field of Classification Search
USPC ............. 219/159, 444.1, 465.1, 466.1, 543; 360/97.03, 125.31, 125.32, 125.74, 360/125.75; 361/234; 369/154
See application file for complete search history.

(56) References Cited

U.S. PATENT DOCUMENTS

| | | | |
|---|---|---|---|
| 4,881,142 A | 11/1989 | Kato | |
| 6,107,608 A * | 8/2000 | Hayes | 219/444.1 |
| 6,229,303 B1 | 5/2001 | Guzik | |
| 6,483,300 B1 * | 11/2002 | Severson et al. | 324/212 |
| 6,574,105 B2 | 6/2003 | Nakano | |
| 6,646,436 B2 | 11/2003 | Mihara | |
| 7,173,415 B1 | 2/2007 | Duan | |
| 2003/0015516 A1 * | 1/2003 | Natsuhara et al. | 219/444.1 |

* cited by examiner

*Primary Examiner* — Brian Jennison
(74) *Attorney, Agent, or Firm* — Mitchell K. McCarthy; McCarthy Law Group

(57) ABSTRACT

Embodiments of the present invention are directed to establishing a desired position control over a workpiece by compensating for thermal cycling affecting a member supporting the workpiece during processing.

19 Claims, 8 Drawing Sheets

POSITION CONTROL WITH COMPENSATION FOR THERMAL CYCLING OF A WORKPIECE SUPPORT

BACKGROUND

Media certification is a process that is performed to ensure a requisite quality level exists in a media's capability to store data and retain it. Generally, certification involves writing a preselected user data pattern in the storage area and then analyzing a readback signal for indications of flaws in the media. A flaw may exist because of nonconformities in the media, or may be due to a presence of contamination or debris. Screening the media for flaws before it escapes the factory or even reaches the finished goods is essential to building the expected quality and reliability into the end product.

Media servowriting is a process whereby servo information is stored to media in a deliberate manner to delineate the storage area into an addressable space. In a data storage disc, for example, addressable locations are defined at the intersection of a designated radial position, such as track number, and a designated rotational position, such as sector number. Pluralities of discrete servo sectors form rings across the storage space, be they concentric or spiral rings. A data transfer element continuously feeds the servo information back to a servo control system as the element is moved about in the storage space. The control system utilizes the servo information to position the element, such as in deriving an optimal trajectory for moving the element to a desired track and maintaining the element at the desired track.

Both certification and servowriting entail carrying out relatively time-intensive processes within what is a highly automated and fast paced manufacturing system. The claimed embodiments are directed to improvements in both the effectiveness and the efficiency with which processes such as certifying and servowriting can be performed.

SUMMARY

Embodiments of the present invention are directed to establishing a desired position control over a workpiece by compensating for thermal cycling affecting a member supporting the workpiece during processing.

In some embodiments an apparatus is provided having a housing with a support surface supportingly engaging an external surface of a spindle assembly. The spindle assembly, in turn, operably positions a workpiece during a process. A heat source is interposed in a conductive thermal transfer relationship simultaneously with both the support surface of the housing and with the external surface of the spindle assembly. A workpiece position controller selectively activates the heat source to conductively transfer heat to the housing in response to an indication that an observed temperature is less than a predetermined threshold value.

In some embodiments a method is provided for: (a) energizing a spindle supporting a workpiece to process the work piece; (b) de-energizing the spindle; (c) activating a heat source if an observed temperature is less than a predetermined threshold value, thereby conductively heating a member that supports the spindle in a manner that is susceptible to thermal variation of the member causing positional variation of the workpiece; (d) supporting another workpiece via the spindle; and (e) de-activating the heat source from conditional step (c) and repeating steps (a)-(d).

In some embodiments an apparatus is provided having a spindle assembly operably rotating a workpiece during a processing operation, and means for positioning the workpiece by restricting positional variation of the workpiece resulting from thermal cycling generated by repeatedly stopping and starting the spindle assembly during the processing operation.

DETAILED DESCRIPTION

Figure 1:
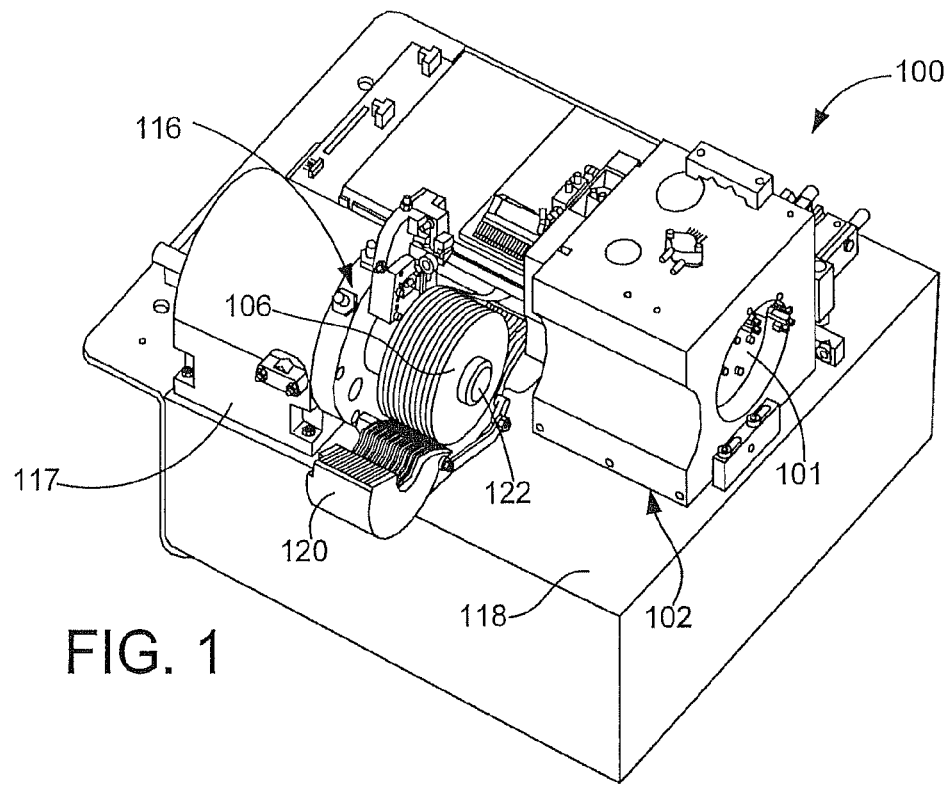
FIG. 1 is an isometric view of a media processing apparatus.
Figure 2:
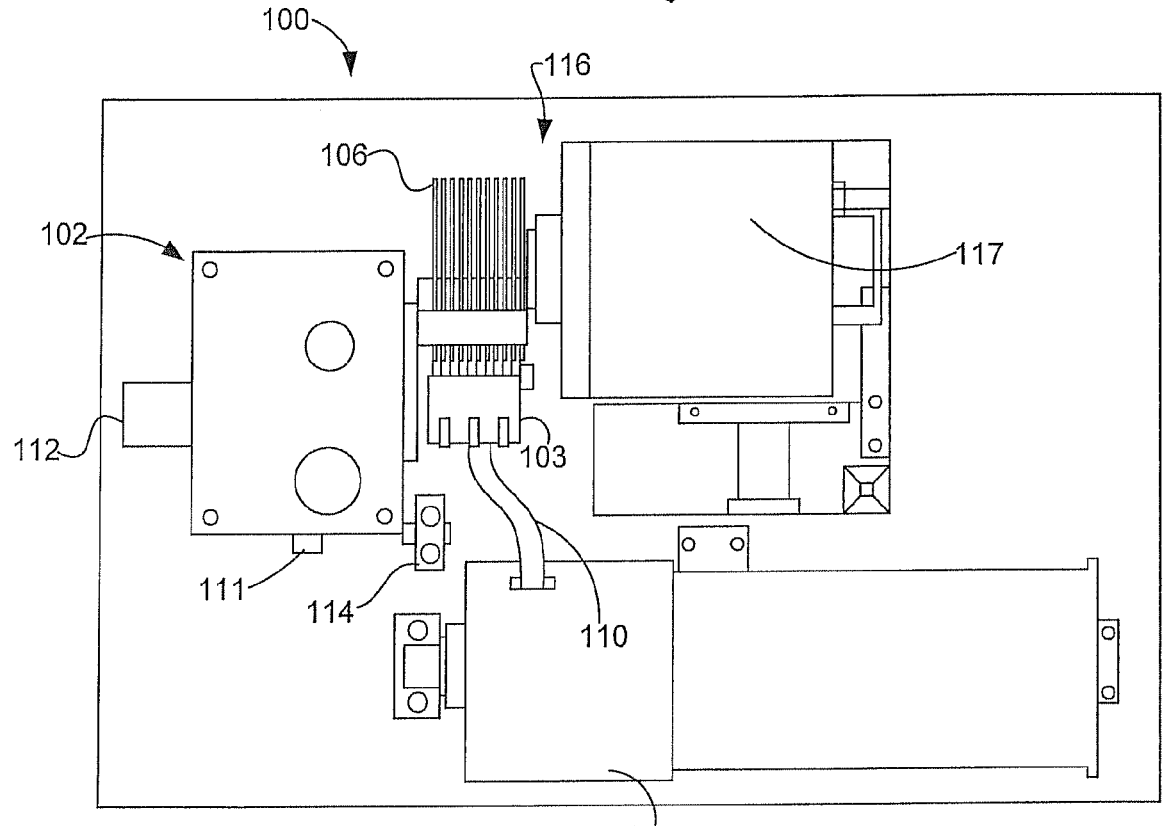
FIG. 2 is a plan view of the apparatus of FIG. 1.
Figure 3:
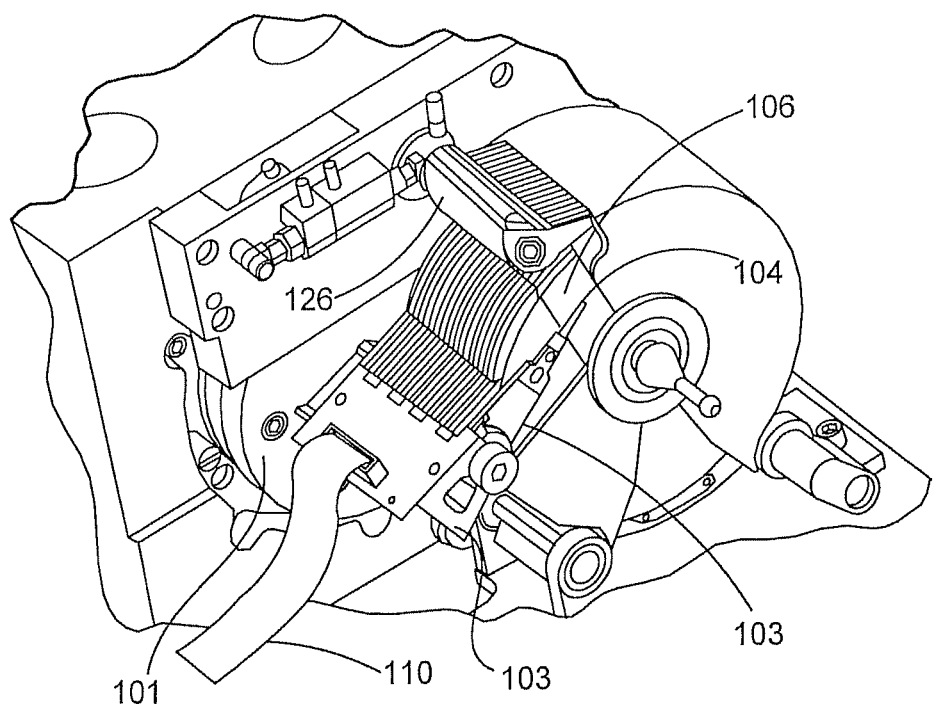
FIG. 3 is an isometric view of a portion of the apparatus of FIG. 1.

FIGS. 1-3 are views of a media processing apparatus 100. Generally, an actuator assembly 102 has a motor 101 that rotatably positions an actuator 103 that, in turn, supports a plurality of data transfer elements 104 at a distal end thereof. Access commands are executed by the apparatus 100 to store data to and retrieve data from a plurality of data storage discs 106. Electronics controlling the functions of the apparatus 100 reside in a control board 108, and signals are communicated between the control board 108 and the elements 104 by a printed circuit cable assembly 110.

The actuator assembly 102 has a base that is floatably supported upon a translational gas bearing (not depicted), and moved thereupon by a slide 111 affixed to a substantially immobile base 118, such as a granite slab. A vacuum chuck 112 selectively fixes the actuator assembly 102 to the base 118 at a desired location for precise lateral positioning of the elements 104. A spindle assembly 116 is supported within a housing 117 that is, in turn, likewise attached to the base 118. The spindle assembly 116 presents the batch of discs 106 to the actuator assembly 102, rotating the discs 106 in a data transfer relationship with the pivotal elements 104. Note that in FIG. 3 the spindle assembly 116 is not shown for clarity sake.

FIG. 1 depicts the apparatus 100 in a load/unload mode whereby the actuator assembly 102 is moved away from the spindle assembly 116 via the slide 111 and translational bearing, and a shroud 120 is moved away from an operable position where it partially encloses the discs 106. This permits unloading a batch of processed discs 106 from the spindle assembly 116, and then loading a next batch of discs 106 to be processed. Preferably, the discs 106 are supported on a removable hub having a clamp 122 at one end thereof for fixing the discs 106 in rotation, and having a mounting feature at the other end thereof for mounting the hub to the spindle assembly 116.

After the next batch of discs 106 to be processed is loaded to the spindle assembly 116, the apparatus 100 is returned to the operational mode depicted in FIG. 3. A comb 126 pivots toward the discs 106 to spreadingly engage the suspension members supporting the elements 104, thereby creating a clearance between opposing elements 104 sufficient for merging the discs 106 with the actuator 103. After merging, the comb 126 clearingly pivots away from the discs 106.

Media processing then begins by spinning the discs 106 and rotating the actuator 103 to present the elements 104 to various storage locations of the respective discs 106. The instantaneous lateral position of the elements 104 can be measured, such as by an interferometer or the like 114, which provides position signals to the control system controlling the motor 101 and the slide 111.

Figure 4:
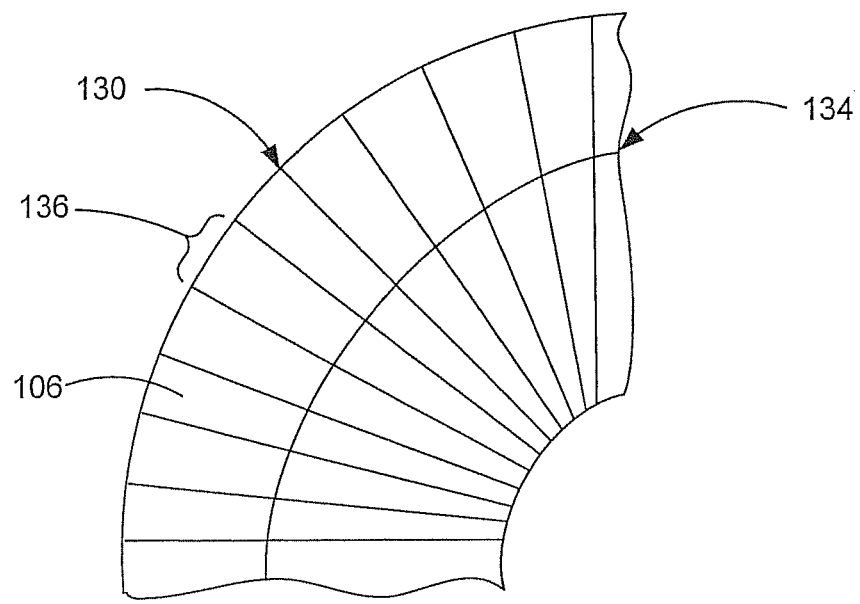
FIG. 4 is a diagrammatic depiction of a manner in which servo wedges and data wedges can be arranged on a disc.
Figure 5:
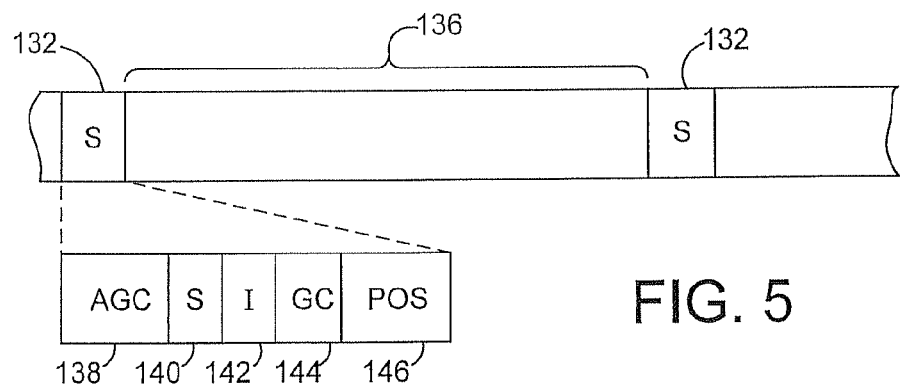
FIG. 5 is a diagrammatic depiction of an illustrative formatted servo sector.

FIGS. 4 and 5 generally depict a manner in which servo data can be arranged on the disc 106 by the media processing. A number of servo data wedges 130 radially span the disc 106 like spokes in a wheel. Each servo wedge 130 is formed by storing a servo field 132 at each of a plurality of data tracks 134 (only one track 134 depicted), the tracks 134 being either concentric or spiral shaped data storage portions of the disc 106. The total number of servo wedges 130 per track 134 depends on the servo sampling rate of a device ultimately using the disc 106. Generally, the number varies from about 100 to 300 servo wedges 130 per data track 134.

User data wedges 136 are defined between adjacent pairs of the servo wedges 130. Preferably, the apparatus 100 formats only the servo wedges 130 during the servowriting process. That is, the user data wedges 136 can remain in the form of unformatted data storage space between adjacent servo wedges 130. Ultimately, however, at a final formatting stage of the manufacturing process the user data wedges 136 are formatted as well to store user data in fixed size addressable blocks, such as 512 bytes each.

A general format of each servo field 132 can include an automatic gain control (AGC) field 138, a synchronization (S) field 140, an index (I) field 142, a Gray code (GC) field 144, and a position field (POS) 146. The AGC field 138 provides an oscillating preamble signal to prepare servo control circuitry for receipt of the remaining servo data. The synchronization field 140 signals the presence of a particular servo data wedge 130 by storing a unique synchronization pattern that is a selected Hamming distance away from other possible combinations of bit patterns on the disc. The index field 142 indicates angular position of the respective servo data wedge 130 on the disc 106 with respect to an index position, such as a baseline zero rotational degree reference. The Gray code field 144 provides a radial track address associated with the respective track 134, and the position field 146 includes servo burst patterns with seams defining servo track portions of each data track 134 that are used by control system processes to detect intra-track location of the element 104.

Thus, during servowriting the apparatus 100 periodically stores discrete sets of servo data to the disc 106 at each track 134. Preferably, the element 104 has a write element portion that can store a wider magnetization pattern than the width of the data track 134. Thus, the entire servo field 132 except for the POS field 146 can be written during one pass of the disc 106, or in other words during only one revolution of the disc 106. The POS field 146 is made up of the servo burst patterns with seams that exist between the data track 134 boundaries, requiring a disc revolution to define each uniquely positioned servo burst seam.

During the intervals that occur between adjacent servo wedges 130 being formatted, when the user data wedges 136 pass by the respective elements 104, the apparatus 100 performs media certification processes. Preferably, all of the user wedges 136 on the disc 106 are certified during the minimum cycle time required for writing all the servo wedges 130. That is, no additional cycle time need be allotted to media certification processes than that minimally required for servowriting, even though a 100% media certification is performed.

For media certification a reference data pattern, such as a 2T oscillating pattern, is stored to each user data wedge 136. Subsequently, a readback signal of the stored user data is analyzed to indicate any presence of flaws in the storage media. Consequently, during each interval between adjacent servo wedges 130 being stored, the elements 104 either store user data to or retrieve a readback signal from a user data wedge 136. For purposes of this description, "user data" means generally a data pattern stored to the user data wedges 136 for the purpose of subsequently retrieving a readback signal from it to scan the media for flaws. In some embodiments the user data can be no more than an oscillating pattern, while in alternative equivalent embodiments the user data can be an encoded data stream like that operably stored to the user data wedge 136 in the normal use of a data storage device.

Figure 6:
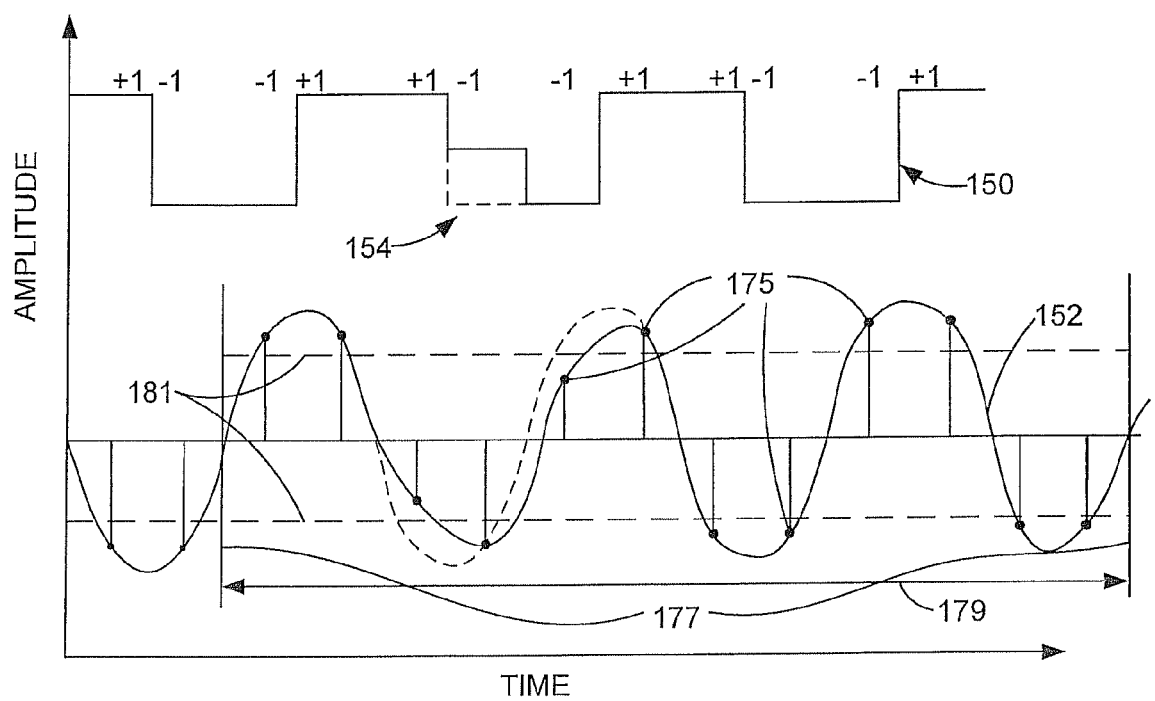
FIG. 6 graphically depicts a 2T oscillating reference waveform in NRZ format and a respective analog readback signal indicating a media flaw.

FIG. 6 graphically depicts a 2T pattern waveform 150 (in NRZ format) and a corresponding readback signal 152, both plotted against an elapsed time abscissa and an amplitude ordinate. Under expected conditions the 2T pattern will provide well behaved readback signal characteristics. However, the presence of a media flaw, such as indicated at 154, will result in a corresponding shift in the sample magnitude values of the readback signal 152. Thus, sampling of the readback signal 152 can provide indications that media flaws exist during the media certification process of the present embodiments.

Figure 9:
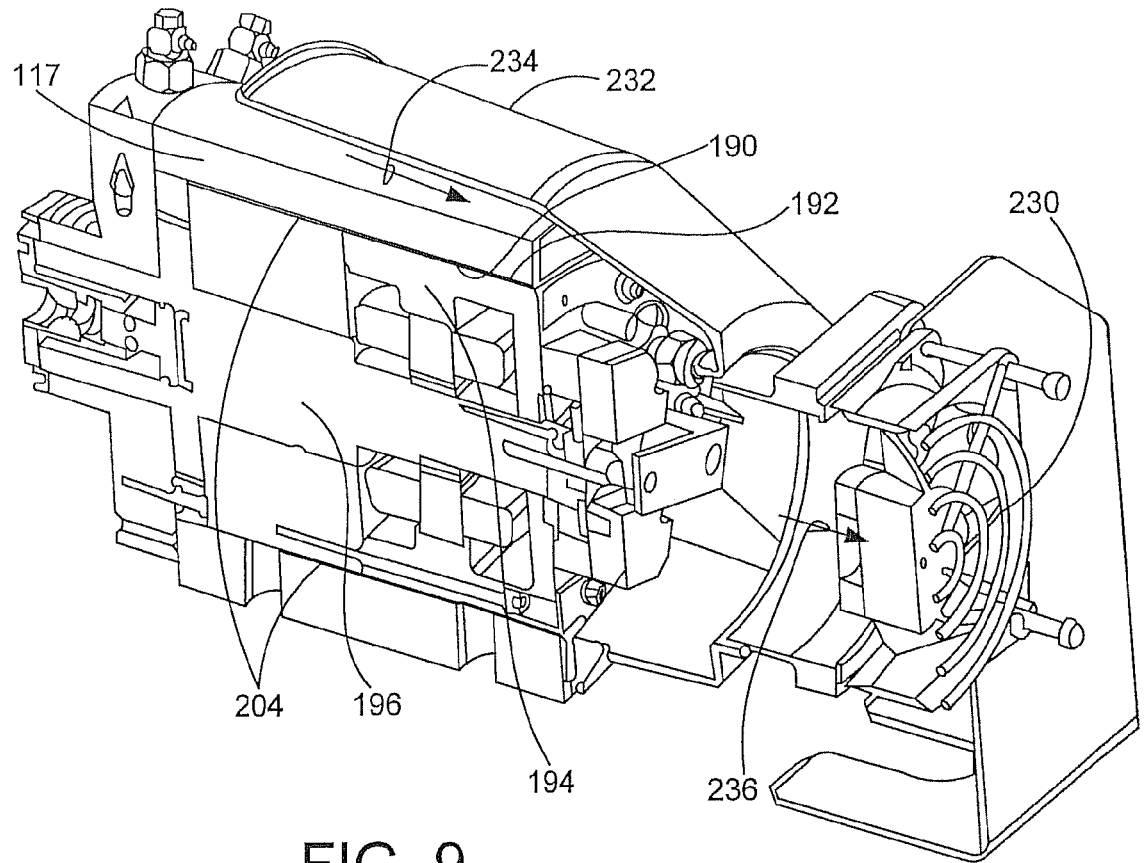
FIG. 9 is an isometric cross sectional diagrammatic depiction of the spindle assembly of FIG. 8.

Referring back to FIG. 1, for purposes of this description the spindle assembly 116 can be a hydrostatic gas-lubricated bearing, which uses an external pressurized fluid source to maintain separation between the bearing surfaces of a stator 194 (FIG. 9) and a rotor 196 (FIG. 9). In equivalent alternative embodiments the spindle assembly 116 can be otherwise constructed, such as but not limited to that of a hydrodynamic bearing which internally generates a pumping pressure to the gas to maintain separation of the bearing surfaces, or that of a mechanical bearing arrangement.

Figure 7:
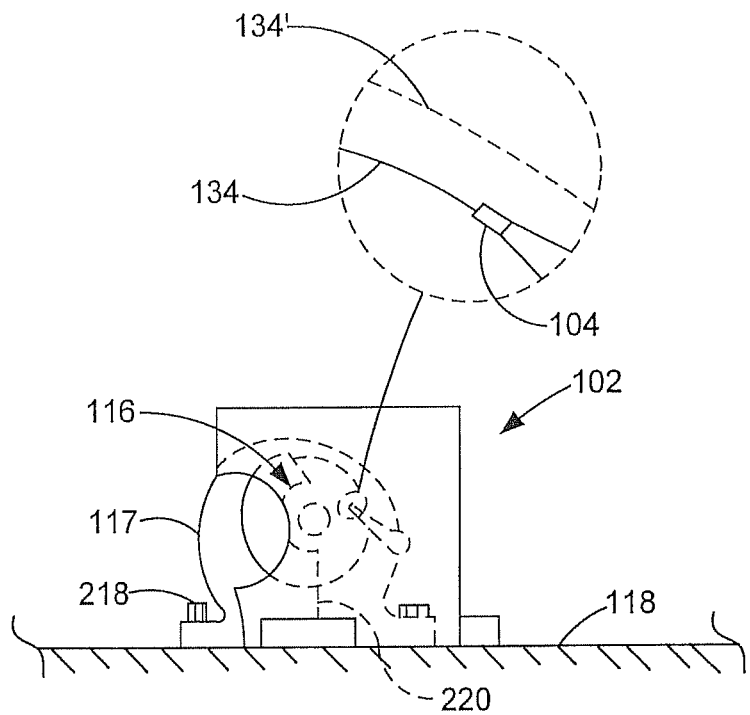
FIG. 7 is an elevational view of the apparatus of FIG. 1 diagrammatically depicting variation in the positional control of the media in relation to the data transfer element due to thermal cycling from repeatedly stopping and starting the spindle assembly.

FIG. 7 is an elevational view of the media processing apparatus 100 during processing of the discs 106, as depicted in the top view of FIG. 2. The actuator assembly 102 operably supports the elements 104 in a data transfer relationship with the respective discs 106, which are rotationally supported by the spindle assembly 116. The actuator assembly 102 is supported independently of the spindle assembly 116 upon the base 118, so that the actuator assembly 102 can be moved laterally, as depicted in FIG. 1, in order to unload the batch of processed discs 106 from the spindle assembly 116.

The spindle assembly 116 generates heat as it spins the discs 106, due to heat generated by its motor, heat generated by shear forces created by the discs 106 spinning within the confines of the shroud 120, and heat generated by frictional engagement between the rotor 196 and the gas in the gaps between the rotor 196 and stator 194. The housing 117 is fixed to the base 118 at its bottom end and has a free end at its top. This mounting arrangement of the housing 117 can make positioning of the disc 106 susceptible to variation from thermal expansion of the housing 117. That is, thermal cycling from heat generated by the spindle assembly 116 can result in positional variation of the housing 117 in the vertical direction. Positional variation of the housing 117 results in positional variation of the discs 106, because the spindle assembly 116 is located with respect to the elements 104 by the housing 117.

Also, it has been observed that due to the differential thermal expansion rates of the housing 117 and the base 118, there is a thermal cycling energy threshold above which the housing 117, which is attached to the base 118 by the bolts 218, can positionally slip, likewise resulting in an undesired positional variation of the discs 106 with respect to the elements 104. This potential for slippage can be reduced by providing a longitudinal expansion slot 220 in the housing 117. The slot 220 creates an opportunity for the differential expansion of the housing 117 with respect to the base 118 to occur at a location distant from the frictional engagement of the bolts 218. This reduces shear forces otherwise tending to result in the slippage of the housing 117 with respect to the bolts 218.

The enlarged detail view in FIG. 7 depicts how the heat generated by spinning up the spindle assembly 116 can cause positional error. The target track 134, to which the element 104 is either seeking or tracking, is displaced from one physical location (depicted by a solid line) to a different physical location (depicted by a broken line) as a result of either thermal expansion or slippage of the housing 117.

Figure 8:
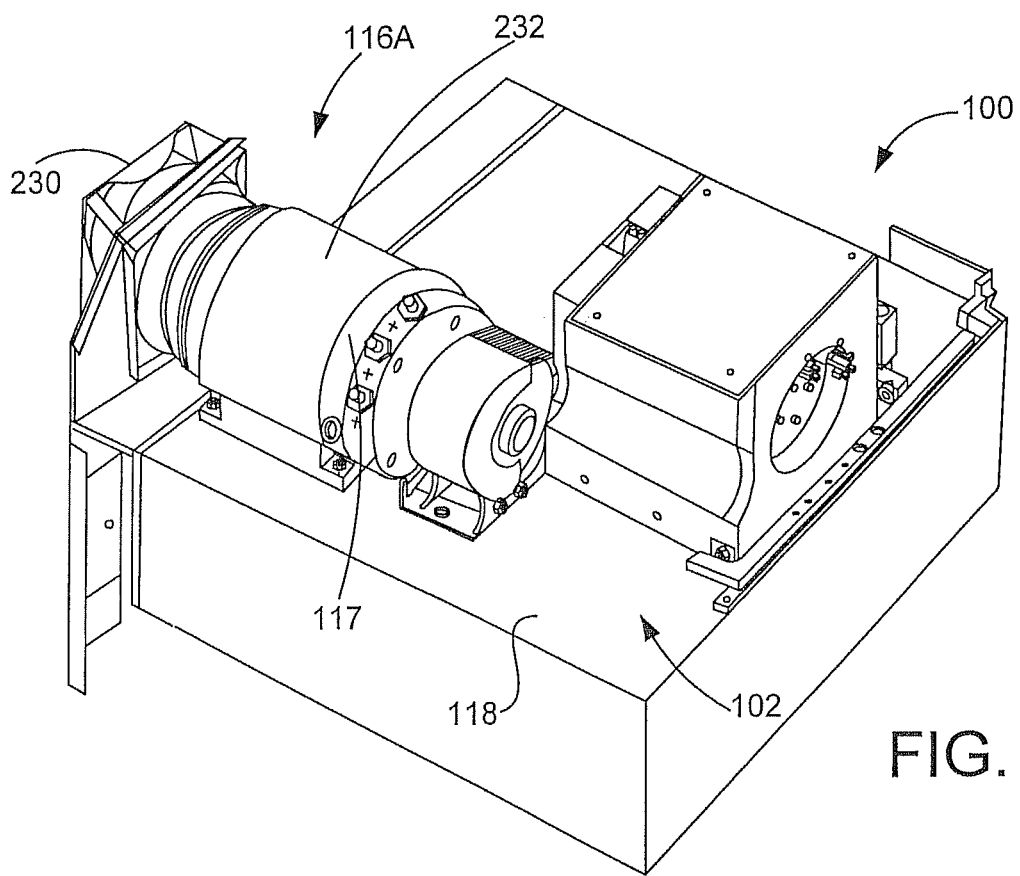
FIG. 8 an isometric view of a media processing apparatus constructed in accordance with embodiments of the present invention.

FIG. 8 is a view similar to FIG. 1 but depicting a spindle assembly 116A outfitted with a workpiece position control system that compensates for the thermal cycling described above. The workpiece position control system includes a heat transfer device such as that depicted here and in more detail in FIG. 9. The workpiece position control also includes a heat source such as that depicted in FIGS. 9 and 10.

Staying with FIGS. 8 and 9, they depict a heat transfer device constructed of a motorized fan 230 and a shroud 232 circumscribing the housing 117 in accordance with these illustrative embodiments. The shroud 232 is spatially disposed from the housing 117 to define a channel 234 that is in fluid communication with an inlet 236 of the fan 230. Thus, activating the fan 230 draws fluid currents through the channel 234 that impingingly engage against the housing 117 to convectively transfer heat from the external surface of the housing.

Figure 10:
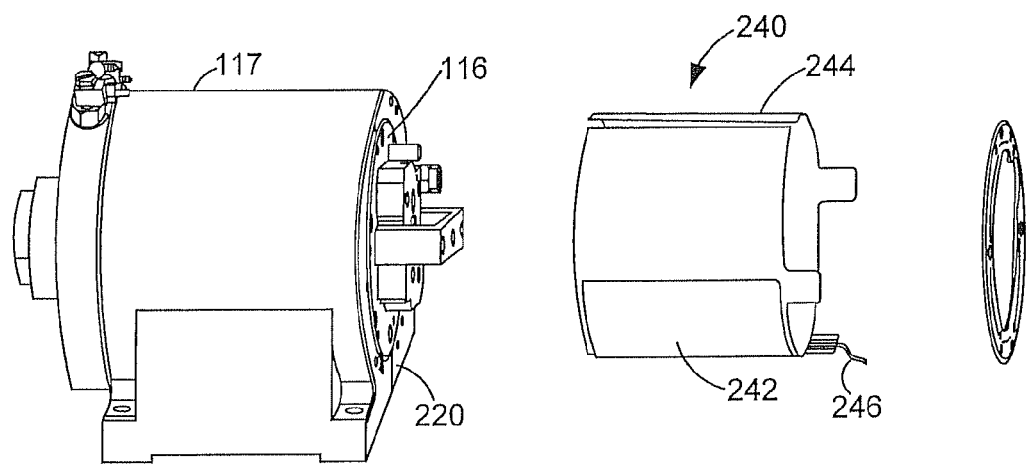
FIG. 10 is a partially exploded isometric depiction of the spindle assembly of FIG. 8.

FIGS. 9 and 10 depict a heat source constructed of an electrical resistance heater 240 that is interposed between and contactingly engages both the internal surface 190 of the housing 117 and the external surface 192 of the stator 194. In the depicted embodiments the heater 240 is constructed of a thin heating element 242 that is adhered to a rigid thermally conductive substrate 244, such as a thin sheet of steel. This construction is particularly advantageous in that it permits removing and/or installing the heater 240 without changing the setup between the spindle assembly 116A and the actuator assembly 102. That is, by loosening the grip of the bolts 218 on only one side of the housing 117, the opening in the housing 117 can be slightly enlarged by laterally expanding the longitudinal expansion slot 220. The bolts 218 not loosened maintain the setup relationship between the discs 106 and the actuator assembly 102. The heater 240 is then installed by inserting the rigid substrate 244 into the space created between the housing 117 and the stator 194. The electrical leads 246 connected to the heating element 242 can be located at the bottom as illustrated so as to trace within the longitudinal expansion slot 220 of the housing 117. The housing 117 is then compressed against the heater 240 to contactingly engage it on both sides thereof, and the bolts 218 are re-tightened to maintain that conductive thermal transfer relationship between the heater 240 and both the stator 194 and the housing 117.

Figure 11:
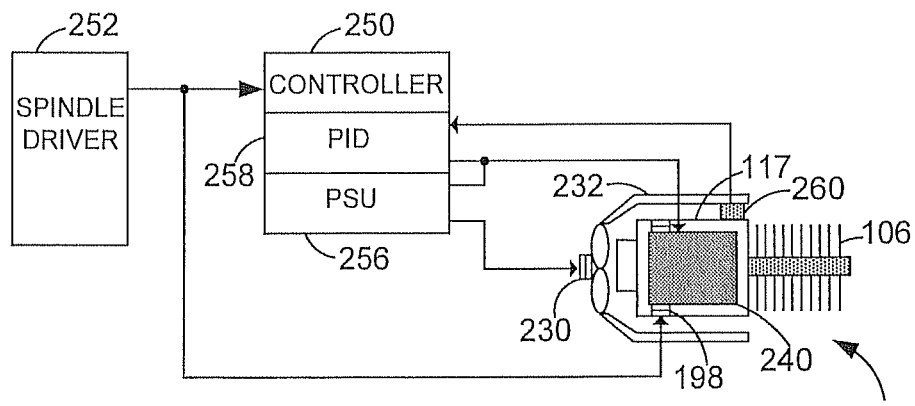
FIG. 11 is a functional block diagram of a portion of the media processing apparatus of FIG. 8.

FIG. 11 is a functional block diagram depicting a workpiece position controller 250 of the spindle assembly 116A that is interlocked to a spindle driver circuit 252 of the media processing apparatus 100. The workpiece position controller 250 controls power supplied to the spindle assembly 116A. The workpiece position controller 250 is a processor-based control that executes processing instructions stored in memory to regulate a power supply unit 256 supplying power to energize the fan 230 and to energize the heater 240. In the illustrative embodiments the workpiece position controller 250 provides a supply voltage to the heater 240 via proportional-integral-derivative control 258 that is responsive to a feedback signal from a temperature sensor 260 on the housing 117. The temperature sensor 260 is located on the housing 117 because it is the target for maintaining a desired stable temperature throughout an interval during which the spindle assembly 116A is energized and de-energized as batches of discs 106 are processed.

Figure 12:
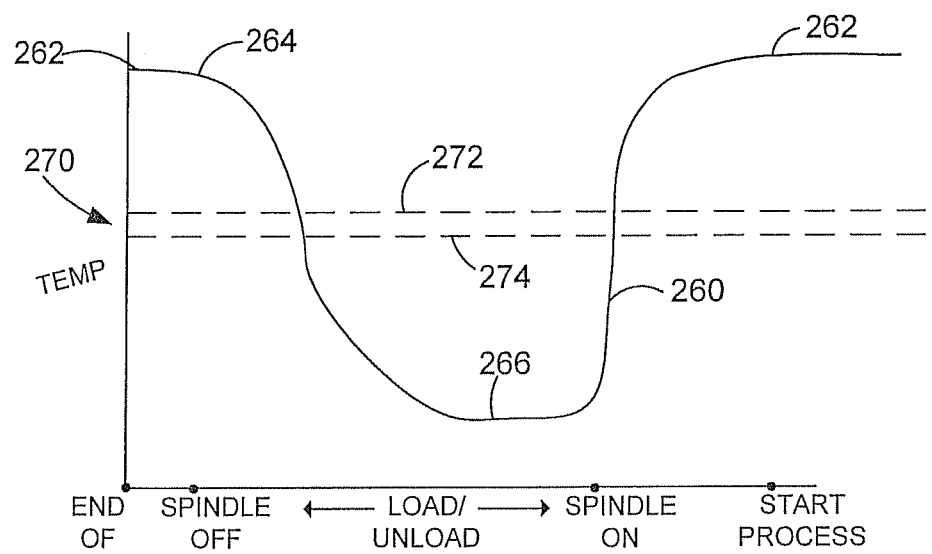
FIG. 12 graphically compares the thermal cycle in the spindle assembly of FIG. 1 to the thermal cycle of the spindle assembly of FIG. 8.

FIG. 12 graphically depicts in curve 260 how the temperature of the housing 117 in the spindle assembly 116 of the media processing apparatus of FIG. 1 varies during the interval of unloading a batch of processed discs 106, loading the next batch of discs 106 to be processed, and then beginning the processing of the next batch of discs 106. The temperature is at a relative maximum steady state temperature 262 at the end of the previous processing cycle. At 264 the motor driver 252 (FIG. 11) de-energizes the spindle assembly 116. Generally, the temperature decays as the spindle assembly 116 winds down because heat continues to transfer from the spindle assembly 116 but substantially no heat is being generated while the spindle assembly 116 is de-energized. The thermal decay continues throughout the interval that the processed discs 106 are unloaded and the next batch of discs 106 are loaded. At 266 the thermal decay reaches a minimum temperature immediately before the motor driver 252 again energizes the spindle assembly 116. The temperature then rises during acceleration of the spindle assembly 116 until the steady state temperature 262 is reached.

The embodiments of the present invention reduce the variation between the maximum and minimum temperatures during each processing cycle, such as 262, 266, respectively, so that the housing 117 temperature varies within a predetermined temperature band 270 defined by upper and lower threshold temperatures 272, 274, respectively. Embodiments of the present invention have been practiced that successfully maintained the housing 117 temperature variation during media processing within a band of two degrees Celsius. This extent of temperature control effectively makes negligible any amount of positional variation of the discs 106 with respect to the elements 104 that occurs due to thermal cycling created by repeatedly energizing and de-energizing the spindle assembly 116A.

Figure 13:
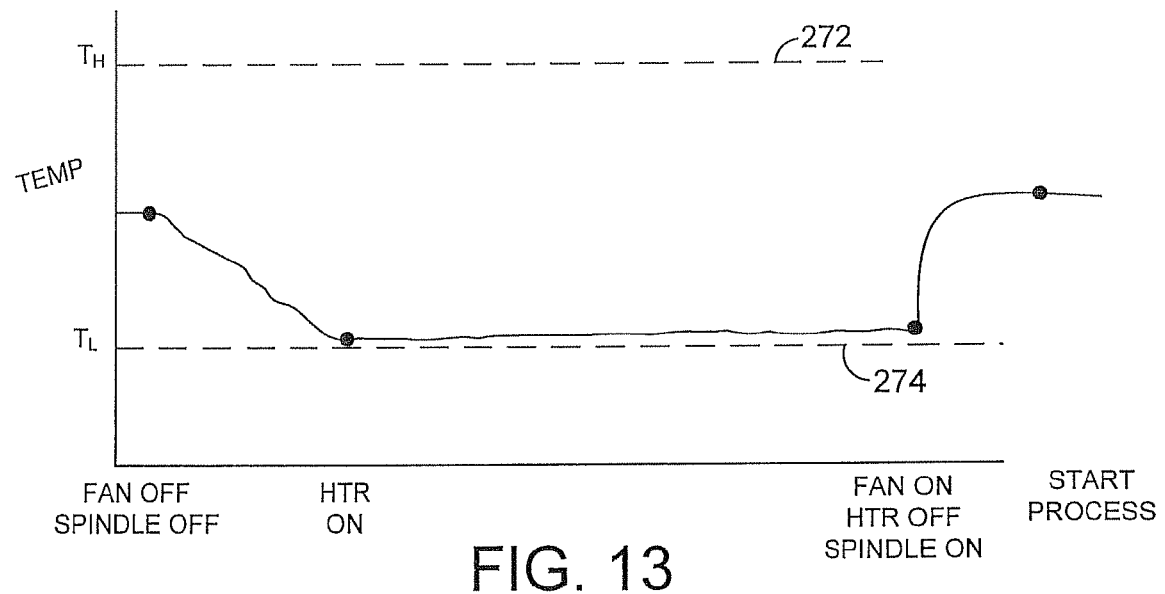
FIGS. 13 and 14 graphically depict thermal cycles of the spindle assembly of FIG. 8 with and without a predetermined delay between de-energizing the heat transfer device and de-energizing the spindle assembly, respectively.
Figure 14:
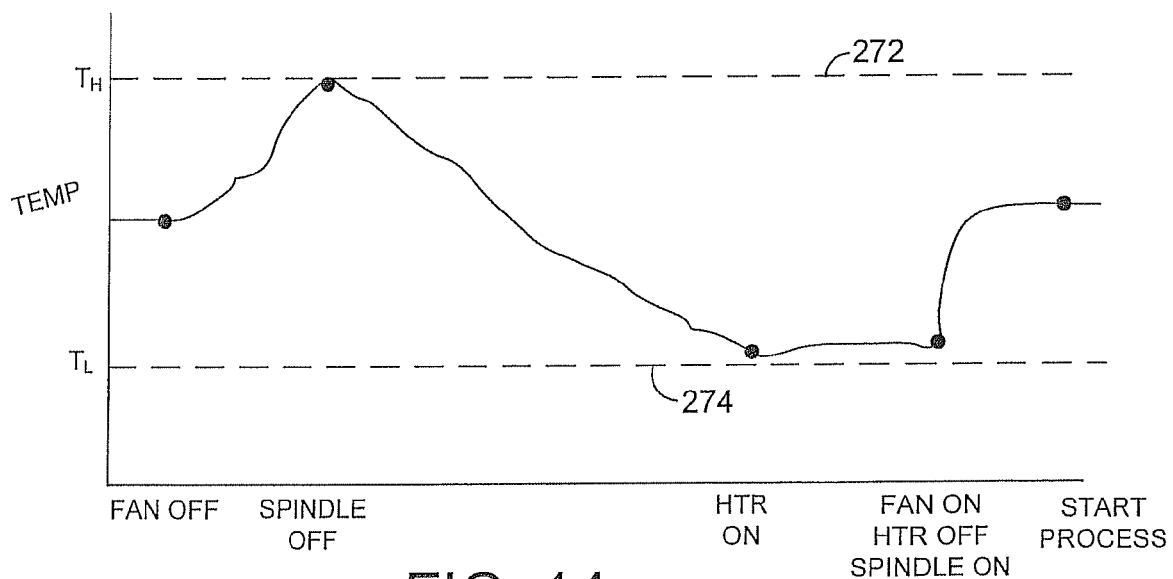

FIGS. 13 and 14 depict temperature curves resulting from two illustrative control schemes executed by the workpiece position controller 250. In the embodiments of FIG. 13 the workpiece position controller 250 de-energizes the fan 230 at the same time that the motor driver circuit 252 (FIG. 11) de-energizes the spindle assembly 116A. The temperature of the housing 117 decays from the steady state temperature as the spindle assembly 116A winds down. When the temperature decays to that of a predetermined margin above the lower threshold 274, the workpiece position controller 250 energizes the heater 240 to maintain the temperature just above the lower threshold during the interval that the processed discs 106 are unloaded and the next batch of discs 106 are loaded. When the motor driver circuit 252 again energizes the spindle assembly 116A, the workpiece position controller 250 simultaneously de-energizes the heater 240 and energizes the fan 230.

In the embodiments of FIG. 14 the workpiece position controller 250 de-energizes the fan 230 and then the motor driver circuit 252 de-energizes the spindle assembly 116A after a predetermined delay. This results in the temperature of the housing 117 rising from the steady state temperature to that of a predetermined margin below the upper threshold temperature 272. The temperature of the housing 117 then decays from the upper threshold temperature after the spindle assembly 116A is de-energized. In comparison to the embodiments of FIG. 13 it will be noted that this delays energizing the heater 240 and shortens the interval during which it is energized. Delaying the energizing of the heater 240 in this manner can make it possible to forego its use altogether if the unloading and loading portions of the cycle can be completed before the temperature decay reaches the lower threshold.

Note that in both FIGS. 13 and 14 the workpiece position controller 250 de-energizes the heater 240 at all times when the discs 106 are being processed. This is advantageous in that it has been observed that energizing the heater 240 during a processing cycle can result in unacceptable positional variation of the discs 106 during media processes such as those described and contemplated herein.

Figure 15:
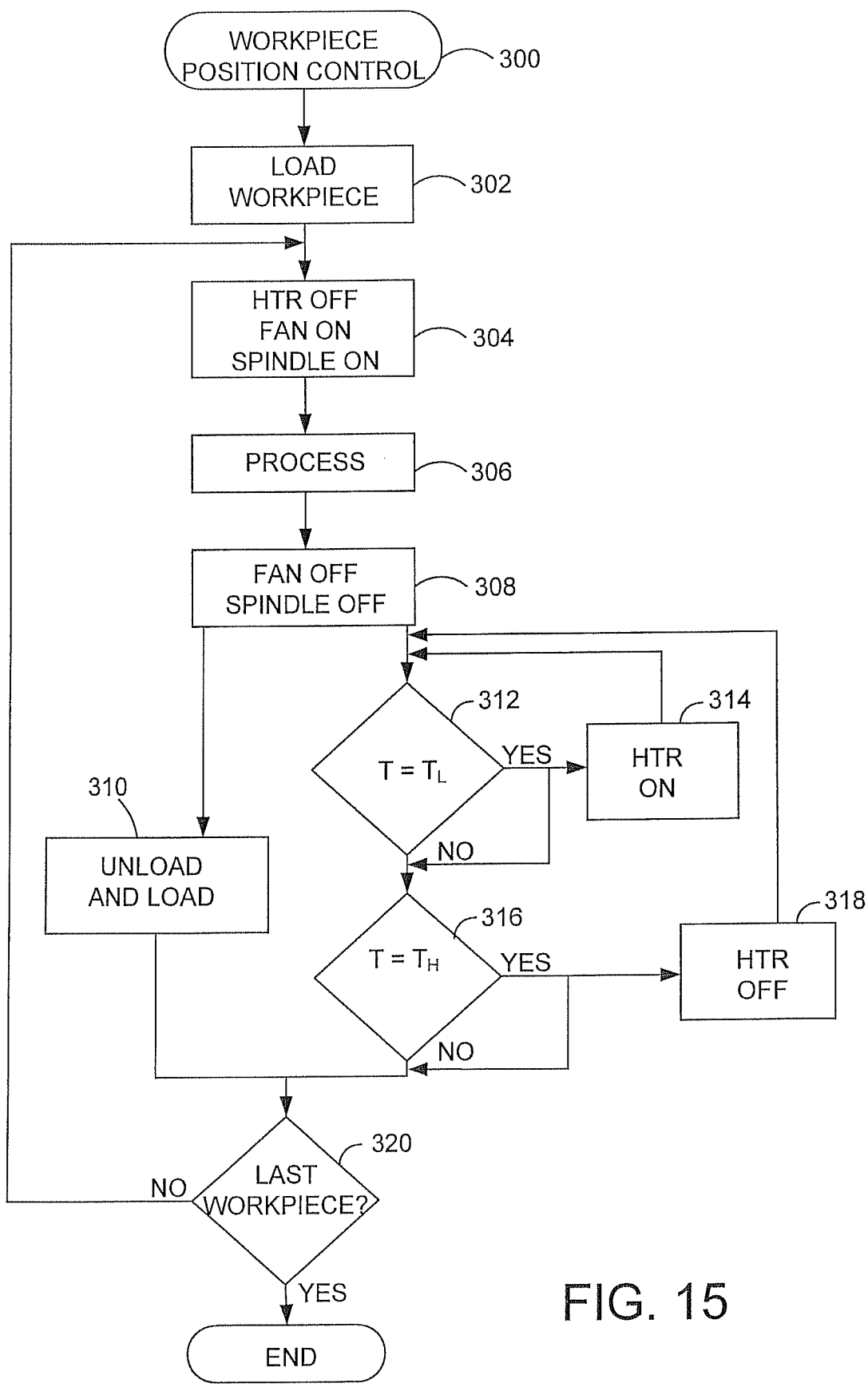
FIG. 15 is a flowchart that depicts steps in a method for WORKPIECE POSITION CONTROL carried out in accordance with embodiments of the present invention.

FIG. 15 is a flowchart depicting steps in a method 300 for WORKPIECE POSITION CONTROL that are practiced in accordance with embodiments of the present invention. The method begins in block 302 by loading the workpiece, such as the discs 106, to the spindle assembly 116A. Control then passes to block 304 where the motor driver circuit 252 energizes the spindle assembly 116A, and the workpiece position controller 250 responsively de-energizes the heater 240 and energizes the fan 230. Processing of the workpiece then takes place in block 306, causing the housing 117 temperature to rise to the designed steady state temperature.

When processing is completed, control passes to block 308 where the motor driver circuit 252 de-energizes the spindle assembly 116A and the workpiece position controller 250 responsively de-energizes the fan 230. In some embodiments they may be de-energized simultaneously as depicted in FIG. 13 or a predetermined delay may be executed as depicted in FIG. 14. Throughout the interval that the previously processed workpiece is being unloaded and the next workpiece is being loaded in block 310, the workpiece position controller 250 continuously controls the housing temperature 117 so that it remains within the band of the upper and lower thresholds 272, 274 by energizing and de-energizing the fan 230 and heater 240.

To that end, in block 312 it is determined whether the housing 117 temperature is within the margin of the lower threshold temperature 274. If the determination of block 312 is yes, then control passes to block 314 where the heater 240 is energized. While the temperature is continuously being compared to the lower threshold in block 312, control also passes to determine in block 316 whether the housing 117 temperature is within the margin of the upper threshold temperature 272. If the determination of block 316 is yes, then control passes to block 318 where the heater 240 is de-energized. The temperature is continuously compared to both thresholds in blocks 312 and 316 throughout the idle time of unloading and loading the workpieces in block 310. In block 320 it is determined whether the last workpiece has been processed. If the determination of block 320 is yes, then the method 300 ends; otherwise, control loops back to block 304 and the method cycles through the steps in the manner aforedescribed.

Generally, the embodiments disclosed herein cover an apparatus and associated method for processing a workpiece with a spindle assembly operably rotating the workpiece, and means for positioning the workpiece by restricting positional variation of the workpiece due to thermal cycling associated with repeatedly stopping and starting the spindle assembly during the processing. For purposes of this description and meaning of the appended claims, the term "means for positioning" has a meaning that encompasses the structure disclosed herein and structural equivalents thereof that are capable of providing workpiece positional control by compensating for positional variation that results from thermal expansion and contraction of a support member that is heated and cooled during processing of the workpieces.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing the processing of data storage discs, it will be appreciated by those skilled in the art that the claimed subject matter is not so limited and various other systems can utilize the present embodiments without departing from the spirit and scope of the claimed invention.

What is claimed is:

1. An apparatus comprising:
 a housing having a support surface supportingly engaging an external surface of a spindle assembly, wherein the spindle assembly, in turn, operably positions a workpiece during a process;
 a substantially cylindrical heat source operably interposed in a conductive thermal transfer relationship simultaneously with both the support surface of the housing and with the external surface of the spindle assembly; and
 a workpiece position controller that selectively activates the heat source to conductively transfer heat in response to an indication that an observed temperature is less than a predetermined threshold value.

2. The apparatus of claim 1 wherein the workpiece position controller activates and de-activates the heat source to maintain the housing at a desired substantially constant temperature throughout an interval during which the spindle assembly is operable, to process respective workpieces, and during which the spindle assembly is non-operable, to unload processed workpieces and load unprocessed workpieces.

3. The apparatus of claim 1 wherein the heat source comprises an electrical resistance heater contactingly engaging the support surface of the housing on one side thereof and contactingly engaging the external surface of the spindle assembly on an opposing side thereof 4. The apparatus of claim 3 wherein the workpiece position controller comprises a proportional-integral feedback control loop that varies a control current to the electrical resistance heater.

5. The apparatus of claim 1 wherein the workpiece position controller selectively activates a heat transfer device to transfer heat away from an external surface of the housing opposing the support surface.

6. The apparatus of claim 5 wherein the heat transfer device comprises a motorized fan operably impinging fluid currents against the housing to convectively transfer heat away from the external surface of the housing.

7. The apparatus of claim 6 comprising a shroud circumscribing the external surface of the housing and spatially disposed therefrom to define a channel in fluid communication with an inlet of the motorized fan.

8. The apparatus of claim 5 wherein the workpiece position controller de-activates the heat transfer device and then the spindle assembly switches from an operable state to an inoperable state after a predetermined delay, the delay corresponding to an interval during which the observed temperature does not exceed a predetermined second threshold value.

9. The apparatus of claim 8 wherein the workpiece position controller varies the predetermined delay between a low value of zero and a high non-zero value to obtain a desired rise in the observed temperature after de-activating the heat transfer device.

10. The apparatus of claim 1 wherein the workpiece position controller is responsive to a temperature sensor indicating the observed temperature at an external surface of the housing opposing the support surface.

11. The apparatus of claim 1 wherein the workpiece is characterized as a media, and wherein the workpiece position controller operably restricts positional variation of a storage location on the media resulting from thermal cycling that is generated by operation of the spindle assembly and is transferred to the housing as the spindle assembly is switched between an operable state, during which the spindle is energized, and an inoperable state, during which the spindle is not energized.

12. The apparatus of claim 11 wherein the workpiece position controller operably restricts positional variation of the media with respect to a data transfer element capable of at least one of storing data to the media and retrieving data from the media during the process.

13. The apparatus of claim 12 wherein the workpiece position controller operably de-activates the heat source entirely during the at least one of storing data to the media and retrieving data from the media.

14. The apparatus of claim 11 wherein the workpiece position controller operably restricts positional variation of the media with respect to a data transfer element, and further comprising control circuitry capable of certifying the media in relation to data transferred between the media and the data transfer element.

15. The apparatus of claim 11 wherein the spindle assembly comprises:
    a stationary hub defining the external surface; and
    a rotor that operably rotates with respect to the stationary hub without contacting engagement therebetween via a fluid bearing engagement, the media being operably fixed in rotation with the rotor.

16. A method comprising:
    (a) energizing a spindle supporting a workpiece to process the work piece;
    (b) de-energizing the spindle;
    (c) activating a substantially cylindrical heat source operably disposed in a member supporting the spindle if an observed temperature is less than a predetermined threshold value;
    (d) supporting another workpiece via the spindle; and
    (e) de-activating the heat source from conditional step (c) and repeating steps (a)-(d).

17. The method of claim 16 wherein step (c) further comprises de-activating the heat source if the observed temperature is greater than a predetermined second threshold value before subsequently performing step (e).

18. The method of claim 16 wherein step (a) comprises activating a heat transfer device in conjunction with energizing the spindle, and step (b) comprises de-activating the heat transfer device in conjunction with de-energizing the spindle.

19. The method of claim 18 wherein step (b) is characterized by sequentially de-activating the heat transfer device and then de-energizing the spindle after a predetermined delay, wherein the delay is associated with an interval during which a temperature rise of the spindle after de-activating the heat transfer device does not exceed a predetermined second threshold value.

* * * * *